Oct. 20, 1953  C. H. BASLER ET AL  2,655,900
ANIMAL-RESTRAINING DEVICE
Filed July 21, 1950
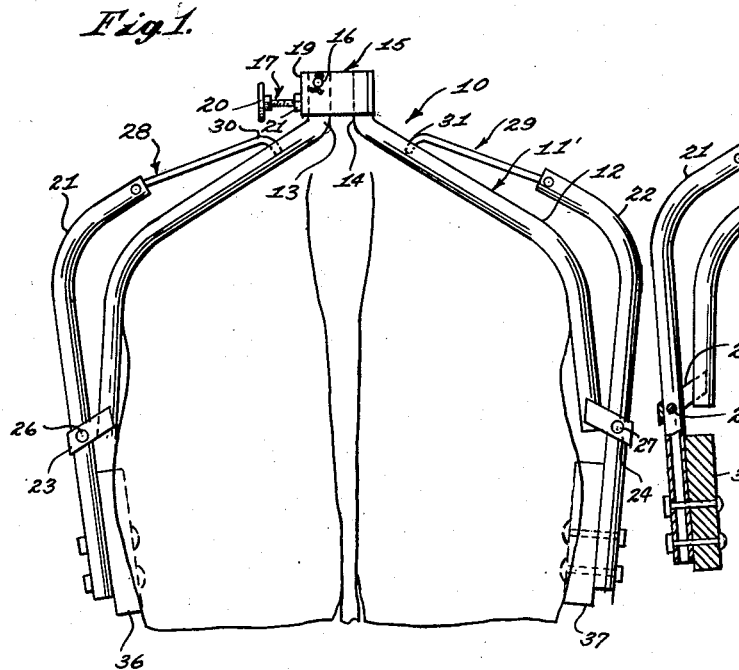
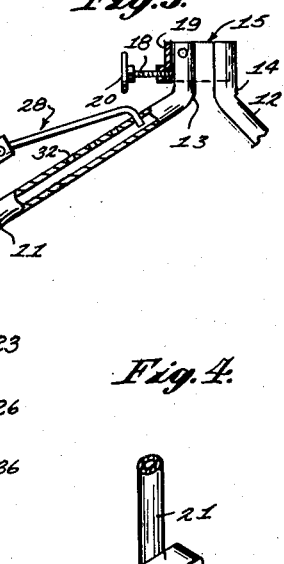
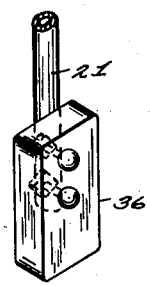
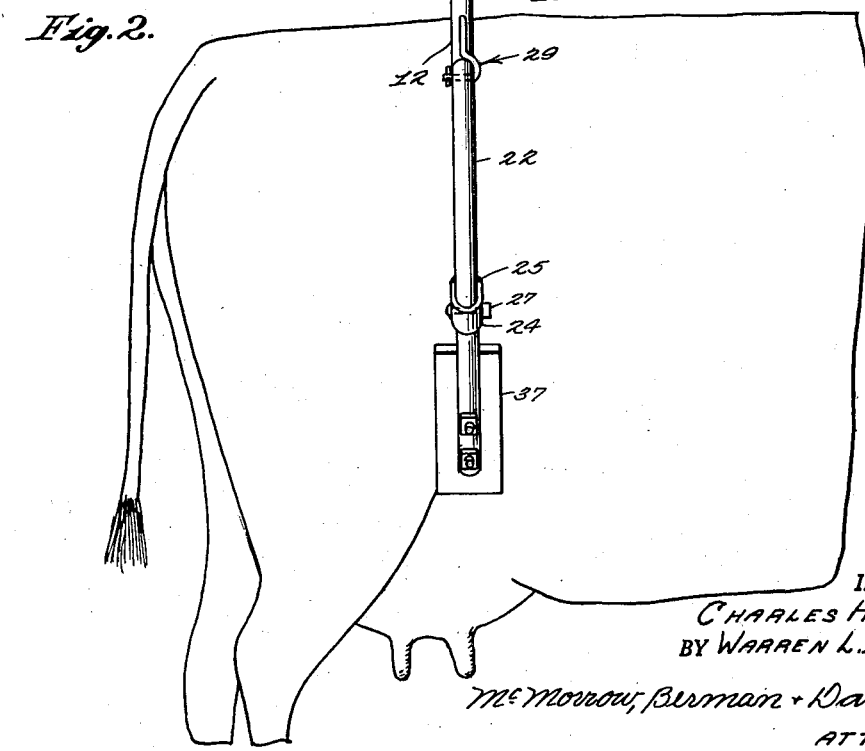
INVENTORS
CHARLES H. BASLER
BY WARREN L. BASLER
McMorrow, Berman + Davidson
ATTORNEYS Patented Oct. 20, 1953

2,655,900

UNITED STATES PATENT OFFICE 2,655,900

ANIMAL-RESTRAINING DEVICE

Charles H. Basler and Warren L. Basler, Oshkosh, Wis.

Application July 21, 1950, Serial No. 175,106

4 Claims. (Cl. 119—126)

This invention relates to animal-restraining devices, and more particularly to an anti-kick device for use on milk cows.

In prior application, Serial No. 142,921, filed February 7, 1950, and now abandoned, there is disclosed an anti-kick device for use on a milk cow which embodies an arched support including arms arranged in face-to-face relation and connected together at one end for pivotal movement toward and away from each other and shaped to fit over a back of a cow at the region of the loins, a lever having a block dependingly supported from one end thereof positioned in side-by-side relation with respect to each of said arms and pivotally connected to the other end of the adjacent one of said arms, and a latch dog having one end pivotally connected to the adjacent lever contiguous to the other end thereof and engageable with one of a plurality of serrations provided exteriorly of and on the adjacent one of the arms.

This invention relates to the same type of anti-kick device in which the arms forming the arched support are connected together at one end by means enabling limited pivotal movement, thereby enabling the device to be selectively adjusted to fit all sizes of cattle. Further, each of the arms is provided with a different means for receiving the latch dogs carried by the lever arms to thereby assure the maintenance of the device in its adjusted position.

An object of this invention is to provide an anti-kick device for use on milk cows to restrain the cows from kicking while being milked, or while their udders are being cleaned or treated, and to constrain a cow to nurse a fostered calf or one which the cow has disowned.

Another object of this invention is to provide an anti-kick device which can be applied to and removed from the cow and quickly adjusted to apply the necessary operative pressure to the skeletal structure of the cow.

A further object of this invention is to provide an anti-kick device which is very simple in structure and relatively cheap to manufacture.

The above and still further objects and advantages of the invention will become apparent upon consideration of the following detailed description of the invention, when taken in conjunction with the accompanying drawings, wherein:

Figure 1 is a rear elevational view of a milk cow with an anti-kick device, constructed according to the present invention, supported in operative position on the cow;

Figure 2 is a side elevational view of a fragmentary rear portion of the cow with the anti-kick device also shown in side elevation;

Figure 3 is a fragmentary rear elevational view of the device shown in Figure 1, with parts broken away and in section; and Figure 4 is a perspective view of one of the blocks forming a part of the present invention, the block being engageable with a rear leg of the cow.

Referring now more particularly to the drawings, wherein like reference numerals have been used throughout the several views to designate like parts, there is shown the anti-kick device of the present invention, generally designated by the reference numeral 10 which includes an arched support 11', the support being fabricated of any suitable light and durable tubular stock and including a pair of curved arms 11 and 12 disposed in face-to-face relation with respect to each other and each having one end, designated by the reference numerals 13 and 14, bent into spaced confronting relation with respect to each other.

Circumposed about the confronting end 13 of the curved arm 11 and having its legs fixedly secured to the confronting end 14 of the arm 12 is a U-shaped supporting bracket, designated by the reference numeral 15. Extending transversely through the confronting end 13 of the curved arm 11 and having its ends supported on the legs of the U-shaped bracket 15 is a pivot pin 16 which mounts the arm 11 for pivotal movement toward and away from the curved arm 12.

Operatively connected to the U-shaped bracket 15 and engageable with the confronting end 13 of the arm 11 is an adjusting means designated by the reference numeral 17 which limits the movement of the arm 11 with respect to the arm 12. As clearly shown in Figure 3, the adjusting means 17 embodies a threaded shank 18 which has one end extending transversely through the bight 19 of the bracket 15 and in threaded engagement therewith, the other end of the shank 18 being provided with a knob 20 for effecting the movement of the shank 18 into and out of engagement with the confronting end 13 of the curved arm 11. Accordingly, the disposition of the adjusting means 17 can be selectively varied to permit the adjustment of the arched support 11' to fit all sizes of cattle.

Circumposed about the threaded shank 18 intermediate its ends and exteriorly of the bracket 15 is a lock nut 21 which may be brought into engagement with the exterior face of the bight 19 of the bracket 15 to thereby hold the adjusting means 17 in a select position of its movement. Accordingly, upon once effecting the adjustment of the arched support 11', the adjustment will be maintained until such later time as the support 11' is readjusted.

Positioned in side-by-side relation with respect to each of the curved arms 11 and 12, and pivotally supported on the latter, are the levers 21 and 22. As clearly shown in Figures 1 and 2, the levers 21 and 22 are pivotally supported intermediate their ends by means of the yokes 23 and 24 which have their legs secured to the adjacent lower ends of the curved arms 11 and 12 by means of the weld, generally designated by the reference numeral 25, each of the yokes supporting the pivot pins 26 and 27 of the levers 21 and 22. The upper end of each of the levers 21 and 22 is bent to substantially conform to the shape of the adjacent portions of the curved arms 11 and 12, while the lower ends project beyond and terminate at a point spaced from the lower ends of the aforementioned curved arms.

Carried by the projecting end of each of the levers 21 and 22 are the blocks 36 and 37 which are engageable with the adjacent one of the rear legs of the cow. The blocks 36 and 37 are preferably formed of a suitable wood so that they will not cut the skin of a cow or cause any damage or injury, and the blocks may be suitably covered or padded if desired.

Pivotally supported on the upper curved end of each of the levers 21 and 22 are the latch dogs 28 and 29, each of which has its free end bent inwardly, as indicated by the reference numerals 30 and 31. As clearly shown in Figure 3, the tubular portions of the curved arms 11 and 12 contiguous to the levers 28 and 29 are provided with a plurality of longitudinally spaced apertures, generally designated by the reference numeral 32, for selectively receiving the curved end of the adjacent one of the latch dogs. Accordingly, each of the levers 21 and 22 can be held in a select position of its pivotal movement.

In actual use, the arms 11 and 12 are spread apart and placed over the back of a cow in the region of the loins, immediately in front of the hip bones, the levers 21 and 22 being free at this time. The upper ends of the levers 21 and 22 are then pulled outwardly, forcing the blocks 36 and 37 together until the necessary operating pressure between the blocks is obtained. The latch dogs 28 and 29 are then engaged in the adjacent one of the apertures 32 to hold the lever in position to apply the operative pressure to the blocks. The blocks contact the front sides of the rear legs of the cow near the lower hip joints, and when the cow attempts to raise one of its rear legs to kick, the associated block causes the arched support 11' to place a pressure on the backbone of the cow sufficient to prevent the kicking movement. The pressure is not, however, sufficient to cause injury to the cow or any severe discomfort, but simply holds the skeletal structure of the cow in a position such that the kicking movement cannot be completed.

Although only one embodiment of the anti-kick device of the present invention has been described, it is readily apparent that numerous modifications can be made without departing from the spirit of the invention as set forth in the appended claims.

What I claim is:

1. An anti-kick device for use on a milk cow comprising an arched support including two curved arms disposed in inwardly opposing relation with respect to each other and having upstanding top ends disposed in spaced relation with respect to each other, means carried by the upstanding top end of one of said curved arms and operatively connected to the upstanding top end of the other of said curved arms for mounting the latter for pivotal movement toward and away from the former, adjusting means threadedly engaged with said first-named means and engageable with said other of said arms for adjustably limiting the movement of the latter away from said one of said curved arms, the upper portions of the arms being each formed with a plurality of spaced latch apertures, respective levers pivoted at their intermediate portions to the lower ends of said curved arms, a block carried by the lower end of each of said levers for engagement with a rear leg of the cow, and a latch lug carried by the upper end of each of said levers and engageable in the latch apertures of the adjacent one of said arms for selectively positioning said levers with respect to said arms.

2. An anti-kick device for use on a milk cow comprising an arched support including two curved arms disposed in inwardly opposing relation with respect to each other and having respective upstanding top ends disposed in spaced relation with respect to each other, means carried by the upstanding top end of one of said curved arms and operatively connected to the upstanding top end of the other of said curved arms for mounting the latter for pivotal movement toward and away from the former, adjusting means threadedly engaged with said first-named means and engageable with said other of said arms for adjustably limiting the movement of the latter away from said one of said curved arms, the upper portions of the arms being each formed with a plurality of spaced latch apertures, respective levers pivoted at their intermediate portions to the lower ends of said curved arms, a block carried by the lower end of each of said levers for engagement with a rear leg of the cow, and a latch lug carried by the upper end of each of said levers and engageable in the latch apertures of the adjacent one of said arms for selectively positioning said levers with respect to said arms, said first named means comprising a U-shaped bracket circumposed about the upstanding end of said other of said arms and having its legs fixedly secured to the upstanding end of said one of said arms and a pivot pin extending transversely through the upstanding end of said other of said arms and having its ends supported on said legs of said U-shaped bracket.

3. An anti-kick device for use on a milk cow comprising an arched support including two curved arms disposed in inwardly opposing relation with respect to each other and having respective upstanding top ends disposed in spaced relation with respect to each other, means carried by the upstanding top end of one of said curved arms and operatively connected to the upstanding top end of the other of said curved arms for mounting the latter for pivotal movement toward and away from the former, adjusting means threadedly engaged with said first-named means and engageable with said other of said arms for adjustably limiting the movement of the latter away from said one of said curved arms, the upper portions of the arms being each formed with a plurality of spaced latch apertures, respective levers pivoted at their intermediate portions to the lower ends of said curved arms, a block carried by the lower end of each of said levers for engagement with a rear leg of the cow, and a latch lug carried by the upper end of each of said levers and engageable in the latch apertures of the adjacent one of said arms for selectively positioning said levers with respect to said arms, said first named means comprising a U-shaped bracket circumposed about the upstanding end of said other of said arms and having its legs fixedly secured to the upstanding end of said one of said arms, and a pivot pin extending transversely through the upstanding end of said other of said arms and having its ends supported on said legs of said U-shaped bracket, and said adjusting means comprising a threaded shank having one end extended threadedly through the bight of said bracket and mounted on the latter for movement transversely thereof.

4. An anti-kick device for use on a milk cow comprising an arched support including two curved arms disposed in inwardly opposing relation with respect to each other and having respective upstanding top ends spaced with respect to each other, means carried by the upstanding top end of one of said curved arms and operatively connected to the upstanding top end of the other of said curved arms for mounting the latter for pivotal movement and away from the former, adjusting means threadedly engaged with said first-named means and adjustably engageable with said other of said arms for limiting the movement of the latter away from said one of said curved arms, the upper portions of the arms being each formed with a plurality of spaced latch apertures, respective levers pivoted at their intermediate portions to the lower ends of said curved arms, a block carried by the lower end of each of said levers for engagement with a rear leg of the cow, and a latch lug carried by the upper end of each of said levers and engageable in the latch apertures of the adjacent one of said arms for selectively positioning said levers with respect to said arms, said first-named means comprising a U-shaped bracket circumposed about the upstanding top end of said other of said arms and having its legs fixedly secured to the upstanding top end of said one of said arms, and a pivot pin extending transversely through the upstanding top end of said other of said arms and having its end supported on said legs of said U-shaped bracket, and said adjusting means comprising a threaded shank having one end extending threadedly through the bight of said bracket and mounted on the latter for movement transversely thereof, hand actuable means disposed exteriorly of said bracket and operatively connected to said shank, and lock means circumposed about said shank and engageable with said bight for holding said shank in adjusted position.

CHARLES H. BASLER.
WARREN L. BASLER.

References Cited in the file of this patent

UNITED STATES PATENTS

| Number | Name | Date |
|---|---|---|
| 1,012,165 | Schimke | Dec. 19, 1911 |
| 1,014,910 | Sharit | Jan. 6, 1912 |
| 1,047,104 | Moss | Dec. 10, 1912 |